United States Patent Office 3,649,458
Patented Mar. 14, 1972

3,649,458
PROCESS FOR THE PREPARATION OF ANTI-
BIOTIC SUBSTANCE SICCANIN
Akio Torikata, Hisashi Kayamori, Yasuo Mase, Keijiro
Murata, and Reizo Maekawa, Tokyo, Japan, assignors
to Sankyo Company Limited
No Drawing. Filed June 25, 1970, Ser. No. 49,947
Claims priority, application Japan, July 3, 1969,
44/52,596
Int. Cl. C12d 9/00
U.S. Cl. 195—81       5 Claims

ABSTRACT OF THE DISCLOSURE

Improved process for the preparation of the antibiotic substance siccanin, which possesses a highly antifungal activity against Trichophyton fungi, by cultivating *Helminthosporium siccans* in a nutrient culture medium where said cultivation is carried out under such a condition that the pH of said culture medium is being gradually brought to a lower pH range than the optimum pH for the growth of said microorganism. According to the present process, the antibiotic substance siccanin can be obtained in a higher yield, as compared with the prior art process.

---

This invention relates to an improvement in the preparation of the antibiotic substance siccanin.

More particularly, it is concerned with a new and improved process for the preparation of siccanin by cultivating *Helminthosporium siccans* in a nutrient culture medium and recovering said antibiotic substance from said culture medium characterized in that said cultivation is carried out under such a condition that the pH of the said culture medium is being gradually brought to a lower pH range than the optimum pH for the growth of said microorganism.

It has been known in the art that the antibiotic substance siccanin is highly effective against Trichophyton fungi, e.g. *Trichophyton interdigitale, Trichophyton asteroides* and the like and produced by cultivation of the microorganism, *Helminthosporium siccans* [The Journal of Antibiotics, Series A, 15, 161, (1962) and Japanese patent publication No. 3548/1962]. According to the teachings of the above-described literatures, it was believed that the above-mentioned siccanin-producing microorganism can produce siccanin just where said microorganism inoculated in a culture medium having an optimum pH range of 5.0–6.0 for the growth thereof grows up to a steadily growing state and the pH of the culture medium is brought to an alkaline pH range. However, where the cultivation is effected under such a condition that the pH of the culture medium is being brought to an alkaline pH range, the siccanin productivity is very poor, a large amount of organic solvent is required in order to recover the desired antibiotic substance because of the migration of a major portion of said antibiotic substance into the cultured broth and the recovery of said antibiotic substance is low due to troublesome purification procedures.

Accordingly, it is earnestly desired in the art to develop a new process capable of producing siccanin in a better yield.

As a result of our extensive studies on an improved process for the microbiological preparation of siccanin, especially the suitable conditions for producing said antibiotic substance in a higher yield, it has been unexpectedly found that an exceptionally high yield of siccanin can be obtained due to increased productivity of siccanin and easiness of purification thereof by effecting the cultivation under such a condition that the pH of the culture medium is being gradually brought to a lower pH range than the optimum pH for said siccanin-producing microorganism.

It is, accordingly, a primary object of this invention to provide an improved and advantageous process for the microbiological preparation of siccanin with a higher yield, as compared with the prior art process.

Other objects and advantages of this invention will be apparent to those skilled in the art from the following description of this invention.

Although it has been heretofore understood that said siccanin-producing microorganism may scarcely grow up below pH 4.5, it was now found that the growth of said microorganism does not adversely affect and the favourable production of siccanin can be accomplished even if the cultivation is effected under such a condition that the pH of the culture medium is being gradually brought to a lower pH range than the optimum pH for the growth of said microorganism, desirably from an optimum growth pH of 5.0–6.0 at the initiation of said cultivation to an acidic pH range up to a pH of 2.5–3.0 at the end of said cultivation.

In carrying out the process of this invention, the pH adjusting as set forth above can be advantageously made either by gradual addition of an acid that would not adversely affect the growth of said siccanin-producing microorganism, for example, hydrochloric acid, sulfuric acid, nitric acid and the like as the microorganism is growing up, or by effecting the cultivation with a culture medium having incorporated therein a nutrient source capable of producing an acid upon its uptake by the microorganism, for example, the ammonium salts of the above-listed acids thereby causing the pH of the culture medium to be brought to a lower pH range as the cultivation progresses.

According to the process of this invention as depicted above, about 4–7 times higher yields of siccanin can be attained, as compared with the prior art process without such a pH adjusting. Moreover, clear and definite shape of the mycelium is still remained at the end of the cultivation wherein the maximum potency of siccanin will be gained and 90% or more of the siccanin produced is concomitant with the mycelium so that the desired antibiotic substance can be recovered by collecting the mycelium and directly extracting therefrom with a hydrophilic solvent, for example, acetone, which requires only a less amount of the extract solvent, as compared with prior art process. Therefore, the present process is advantageous over the prior art in this respect. Further, the purification of siccanin in the process of this invention can be more readily accomplished as compared with the prior art process, since the amount of by-products, siccanin-like substances, in the process of this invention (pH 2.5 at the end of the cultivation) is relatively and definitely smaller than that in the prior art process (pH 8.0 at the end of the cultivation), as demonstrated by a thin-layer chromatography of the hydrophilic solvent extract obtained above [ethanol:n-hexane (1:9) as a developing solvent, colored with benzidine].

Other cultivation procedures and conditions than those fully described hereinabove, including, for example, other ingredients of the culture medium, cultivation processes (either surface or submerged cultivation), cultivation temperatures, cultivation periods, isolation and purification means may be any of those commonly employed in the art for the production of siccanin and may be optionally selected and applied by those skilled in the art.

The following examples are given for the purpose of illustrating of this invention, but they should not be construed to be limiting the scope of this invention. All percentages are given by weight unless otherwise stated.

EXAMPLE 1

The liquid culture medium (pH 5.5) having the following formulation was prepared and charged into a 600 l. volume fermenter.

| | Percent |
|---|---|
| Glucose | 4 |
| "Proflo" * | 0.5 |
| $KH_2PO_4$ | 0.5 |
| $MgSO_4 \cdot 7H_2O$ | 0.25 |
| $(NH_4)_2SO_4$ | 0.5 |
| Tap water (q.s.) to make 300 l. | |

*Trade name, available from Traders Protein Division, U.S.A., containing mainly cotton seed oil cake.

The culture medium thus prepared was inoculated with 10 l. of the prepropagated cultured broth wherein *Helminthosporium siccans* has previously been incubated at a temperature of 27±1° C. for 20 hours. Then, the incubation was effected for 168 hours at a temperature of 27±1° C. under an inner pressure of 1.0 kg./cm.$^2$ and 100% aeration with agitation of 150 r.p.m. During the incubation, the pH of the culture medium gradually fell down and reached to 2.6 at the end of the culture period. The desired antibiotic, siccanin, was produced in a high unit of 4,000 mg. per l. of the cultured broth.

After completion of the incubation, the cultured broth was filtered together with 3% of a filter aid ("Celite," trade name, available from Johns-Manville Corporation, U.S.A.), the filter cake of the mycelium (52.1 kg., the moisture content of 73%) was extracted with 200 l. of acetone, the acetone extract was concentrated and the condensate was transfer-extracted into methylene chloride and the soluble fraction was concentrated to dryness to give 950 g. of siccanin as white crystals, which showed 100% biological activity as compared with the purified authentic specimen of siccanin.

EXAMPLE 2

The liquid culture medium (pH 5.5) having the following formulation was prepared and charged into a 30 l. volume jar-shaped fermenter.

| | Percent |
|---|---|
| Glucose | 4 |
| "Proflo" | 0.5 |
| $KH_2PO_4$ | 0.5 |
| $MgSO_4 \cdot 7H_2O$ | 0.25 |
| Urea | 0.35 |
| Tap water (q.s.) to make 18 l. | |

The culture medium thus prepared was inoculated with 600 ml. of the prepropagated cultured broth prepared as in the above Example 1. Then, the incubation was effected for 144 hours at a temperature of 27±1° C. under an inner pressure of 1.0 kg./cm.$^2$ and 100% aeration with agitation of 350 r.p.m. During the incubation, the pH of the culture medium was gradually lowered by addition of 5% sulfuric acid as the microorganism grew up and adjusted to pH 2.6 at the end of the culture period. The desired antibiotic, siccanin, was produced in a high unit of 4,100 mg. per l. of the cultured broth.

After completion of the incubation, the desired antibiotic was recovered and purified in the same manner as in the above Example 1 thereby yielding 57.8 g. of siccanin as crystals.

In order to clearly demonstrate the favourable results from the process of this invention, the following comparative examples without adjustment of the pH of the culture medium will be given as a reference.

PREPARATION 1

The same procedure as in the above Example 1 was repeated except that the culture medium from which $(NH_4)_2SO_4$ was omitted was employed. The pH of the culture medium was 7.8 at the maximum potency of siccanin and the yield of saccinan was 600 mg. per l. of the cultured broth.

PREPARATION 2

The same procedure as in the above Example 2 was repeated except that the pH of the culture medium was not adjusted. The pH of the culture medium was 8.2 at the maximum potency of siccanin and the yield of siccanin was 650 mg. per l. of the cultured broth.

What is claimed is:

1. In a process for the preparation of the antibiotic siccanin which comprises cultivating *Helminthosporium siccans* in a nutrient culture medium and recovering said antibiotic from said medium, the improvement comprising initiating the cultivation of *Helminthosporium siccans* in a culture medium having a pH of 5.0–6.0 and gradually adjusting the pH of the culture medium to 2.5–3.0 at the end of the cultivation.

2. The improvement according to claim 1 wherein said adjustment of the pH of said culture medium is carried out by gradual addition of an acid as the growth of said microorganism.

3. The improvement according to claim 2 wherein said acid is hydrochloric acid or sulfuric acid.

4. The improvement according to claim 1 wherein said adjustment of the pH of said culture medium is carried out by addition to said medium of a nutrient source capable of producing an acid upon its uptake by said microorganism.

5. The improvement according to claim 4 wherein said nutrient source is ammonium sulfate.

References Cited

Ishibashi, Studies on Antibiotics From Helminthosporium Sp. Fungi VII, Antibiotics, Series A, 15 (1962), pp. 161–167, C.A., vol. 58, 1963, 6158e.

JOSEPH M. GOLIAN, Primary Examiner